United States Patent
Hu et al.

(10) Patent No.: US 8,009,925 B2
(45) Date of Patent: Aug. 30, 2011

(54) METHOD AND APPARATUS FOR PROCESSING VIDEO DATA

(75) Inventors: Wei Hu, Beijing (CN); Qiao Huang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1252 days.

(21) Appl. No.: 11/648,294

(22) Filed: Dec. 29, 2006

(65) Prior Publication Data

US 2008/0159648 A1 Jul. 3, 2008

(51) Int. Cl.
*G06K 9/40* (2006.01)
(52) U.S. Cl. ......... 382/254; 382/195; 382/236; 382/107
(58) Field of Classification Search ........... 382/254, 382/195, 236, 107
See application file for complete search history.

(56) References Cited

OTHER PUBLICATIONS

Wei-Qi Yan et al, Automatic Video Logo Detection and Removal, Multimedia Systems 2005.*
Massimo Piccardi, Background subtraction techniques: a review, IEEE 2004.*
Xiaofeng Tong, et al., "Replay Detection in Broadcasting Sports Video," Dec. 2004, pp. 337-340.
Hongliang Bai, et al., "A Novel Sports Video Logo Detector Based on Motion Analysis," Oct. 2006, pp. 448-457.

* cited by examiner

*Primary Examiner* — Wesley Tucker
*Assistant Examiner* — Mark Roz
(74) *Attorney, Agent, or Firm* — Trop, Pruner & Hu, P.C.

(57) ABSTRACT

In one embodiment of the invention, the invention my concern a method including receiving digital images, each image including object pixels and non-object pixels; and filtering the non-object pixels from the object pixels. Other embodiments are described and claimed.

4 Claims, 3 Drawing Sheets

METHOD AND APPARATUS FOR PROCESSING VIDEO DATA

BACKGROUND

Learning to recognize key objects in video data and then extracting the pixels that compose those objects is a component in content based video processing. Some methods of object detection directly detect each occurrence of an object based on the pixel-wise or block-wise color difference between consecutive frames. Other procedures entail first detecting several occurrences (samples) of the object. A template (usually a frame) is then learned for the object by extracting common characteristics from these acquired samples. For example, some methods use motion feature technique and apply dynamic programming to match the object movement. The extracted object template is then used to scan the whole video to find all occurrences of the object. Each occurrence of the object should contain the same foreground pixels (i.e., object pixels) and different background pixels (i.e., non-object pixels). Thus, foreground pixels may be extracted to represent the object itself. Background pixels may not describe the object and may introduce noise.

Still other methods may be used for extracting the foreground pixels of an object. The object may be highlighted and located at the center of the frame. Thus, only the center and bright pixels are extracted. Other methods may use motion information, assuming pixels that move faster than others are foreground pixels. However, pixels around the margin of the object may be returned. These marginal pixels do not provide accurate information for the object.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
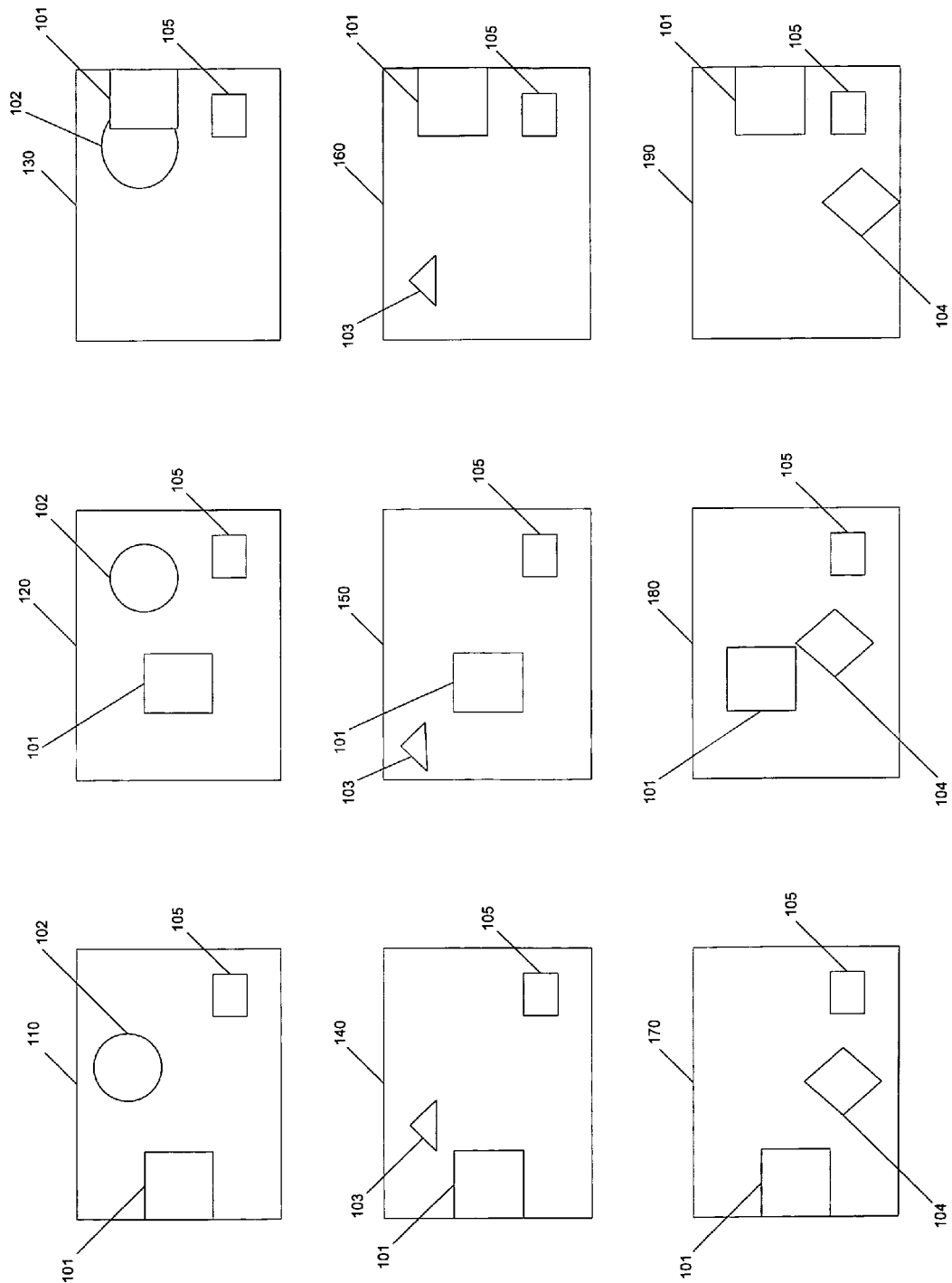
FIG. 1 is a representation of video data in one embodiment of the invention.

FIG. 1 shows multiple occurrences of the same object (e.g., logo) 101 displayed in three video segments. In one embodiment of the invention, these segments may include "instant replays" in of a sporting event. The first replay includes a first sequence of frames 110, 120, 130, the second replay includes a second sequence of frames 140, 150, 160, and the third replay includes a third sequence of frames 170, 180, 190. Each replay is preceded by logo 101 floating across the video frames. Thus, accurate localization and retrieval of logo 101 (i.e., object 101) may be a reliable method to find instant replays or other portions of video data in one embodiment of the invention. These logos 101 may be good candidates for "markers" because each logo 101 occurrence contains consecutive image sequences, the duration of the segment is normally less than one second, the logo may occur many times in a video, the logo may keep the same shape, color, duration and motion model each time, and the background may change greatly for each occurrence of the logo. For example, in the first sequence of frames a background figure 102 may be included. In the second sequence of frames a different background figure 103 may be included. In the third sequence of frames yet another background figure 104 may be included.

Figure 2:
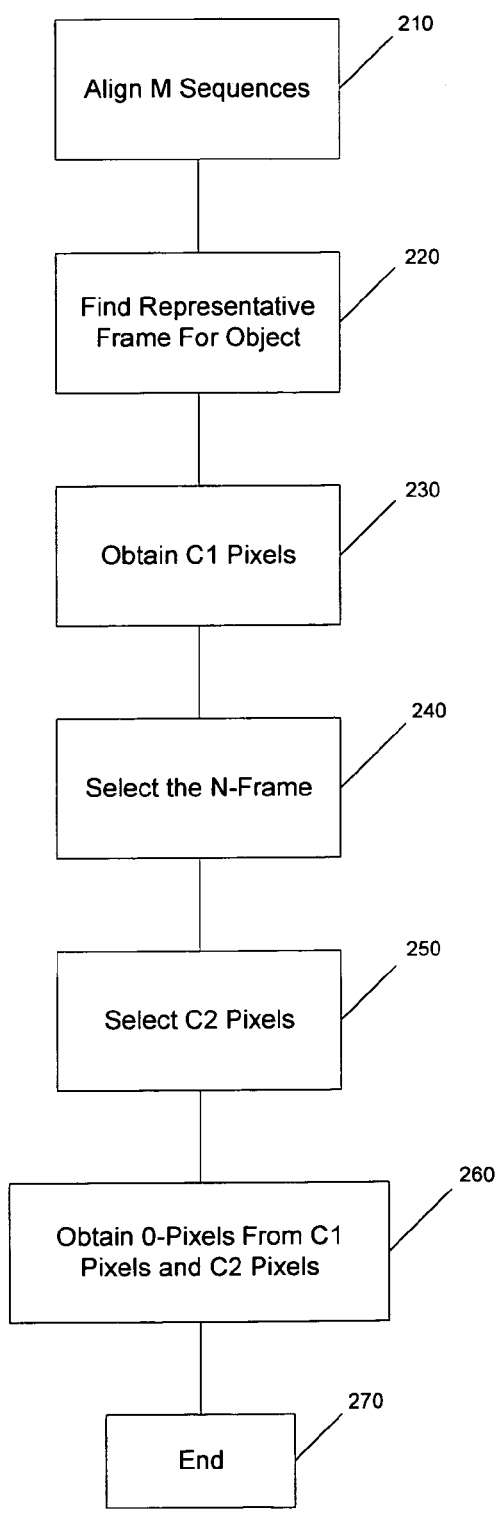
FIG. 2 is a flow diagram of a method of processing video data in one embodiment of the invention.

FIG. 2 shows a flow diagram 200 of a method of processing video data in one embodiment of the invention. In block 210, M sequences are aligned. For example, the first, second, and third sequences of FIG. 1 are aligned. Various methods for aligning sequences are known to those of ordinary skill in the art. For example, in one embodiment of the invention, alignment may be obtained with global programming and the Needleman-Wunsch-Sellers algorithm.

In block 220, a representative frame for an object is found. More specifically, in one embodiment of the invention, for each pair of the example sequences i and j (i.e., any two of the three sequences of FIG. 1), compute the match score $S_{seq}(i,j)$. In one embodiment of the invention, use of motion activity or motion direction is used. However, other methods are known to those of ordinary skill in the art. In one embodiment of the invention, the sum score $S_{seq}$ for each sequence is calculated. For example, such sums may be based on each sequence compared to other aligned sequences. Then, identify the two sequences, when there are more than two sequences, with the highest and second highest summed score. For example, the first and second sequences of FIG. 1 may be selected. Match these two selected sequences again if the score $S_{seq}$ was not retained in, for example, memory. Then find a frame that matches best. This frame may be labeled the k-frame. For example, frame 120 can be identified as a k-frame in FIG. 1. Next, find a frame in each sequence that corresponding to the k-frame. For example, frames 150, 180 may be selected as k-frames. Together, the k-frames form a "k-frame set."

In block 230, C1 pixels (candidate object pixels) are obtained. In one embodiment of the invention, for the identified k-frame set, which contains M frames, the color difference score for each pair of frames is computed. Then, sum up all $N=C_M^2$ values for each pixel in the frame. In FIG. 1, N=3 with three sequences. As another example, N=6 if there are four sequences. For a particular pixel, the cumulated color difference in these N pairs can be computed as $$D = \sum_N |\Delta R| + |\Delta G| + |\Delta B|,$$

where R, G, and B are the colors of the pixel. In video, the object 101 may be substantially unchanged while the background 102, 103, 104 changes greatly. Thus, the smaller the accumulated value D of a pixel, the more possible this pixel is an O-pixel (object pixel) that describes the object 101 foreground. Next, in one embodiment of the invention, all the pixels' cumulated value Ds are sorted in ascending order. In one embodiment of the invention, the top 30%-50% pixels are the candidate O-pixels, called "C1-pixels."

In block 240, the N-frame is selected. From FIG. 1, we can see some of the background pixels 105 may also be considered C1pixels due to their static nature. These background pixels 105 may be, for example, a TV channel logo for a broadcast corporation that does not change frame-to-frame. Those background pixels 105, shown in every frame including both object frames and non-object frames, are noise and should not be the O-pixels. Thus, in one embodiment of the invention, the background pixels 105 may be eliminated. A reference frame may be used to help remove most of the non O-pixels (e.g., 105) include among the C1-pixels. To do so, one may randomly select a frame preceding the k-frame within, for example, 50-100 frame distances. One must make sure the selected frame is not in an object track (i.e., the frame is not a part of an occurrence of the object). Selecting a frame within, for example, 50-100 frame distances, may accomplish this. This selected frame is the "N-frame".

In block 250, C2 pixels (candidate object pixels) are obtained in one embodiment of the invention. To do so, compute the color difference score between the N-frame and each frame of the k-frame set. Then, sum up all M values for each pixel. During a short time span, the background usually changes little. Thus, most of the changes come from the occurrence of the object. Therefore, pixels with bigger difference scores have higher possibility to be the O-pixels. Sort these summed scores for each pixel in descending order. For example, in one embodiment of the invention the top 30%-50% pixels are considered as candidate O-pixels, called "C2 pixels."

In block 260, the O-pixels are obtained from C1 pixels and C2 pixels in one embodiment of the invention. If a pixel is in both C1 and C2 lists, it is identified as an O-pixel. In some embodiments of the invention, the O-pixels contain 20% pixels of the whole frame image. The method ends in block 270.

In one embodiment of the invention, the method and related apparatus may be used to gain a pixel-wise object representation. The method may be used to extract object pixels from multiple occurrences in, for example, video data. The proposed method may concern logo detection in sports videos. However, the idea can be easily generalized to other video types or object types where the object occurs multiple times with little change. This approach can benefit video-content analysis and object representation and retrieval applications. The methods may remove the non-object pixels and get a high-accuracy pixel-wise representation of the object of interest.

As those of ordinary skill in the art will appreciate, embodiments of the invention may be implemented in a computer program. As such, these embodiments may be stored on a storage medium having stored thereon instructions which can be used to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 3:
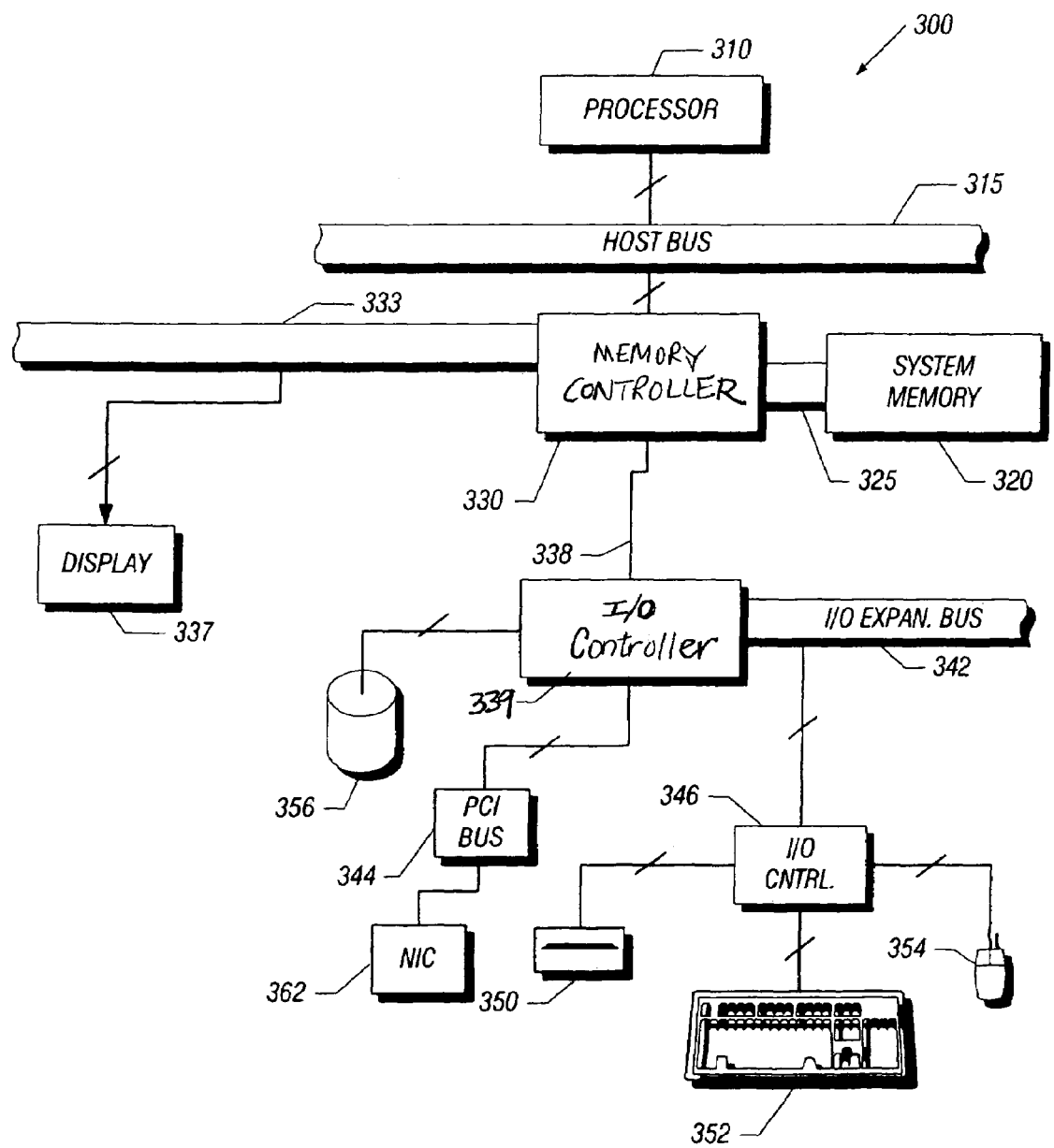
FIG. 3 includes a system for use with embodiments of the invention.

FIG. 3 is a block diagram of a representative data processing system, namely computer system 300 with which embodiments of the invention may be used. In one embodiment, computer system 300 includes a processor 310, which may include a general-purpose or special-purpose processor such as a microprocessor, microcontroller, ASIC, a programmable gate array (PGA), and the like. The processor 310 may be coupled over a host bus 315 to a memory controller 330 in one embodiment, which may be coupled to a system memory 320 via a memory bus 325. The memory controller 330 may also be coupled over a bus 333 to a display 337.

The memory controller 330 may also be coupled (via a link 338) to an input/output (I/O) controller 339 that is coupled to an input/output (I/O) expansion bus 342. The I/O expansion bus 342 may be coupled to an I/O controller 346 that controls access to one or more I/O devices. As shown in FIG. 3, these devices may include, in one embodiment of the invention, storage devices such as a disk drive 350 and input devices, such as keyboard 352 and mouse 354. The I/O controller 339 may also be coupled to, for example, a hard disk drive or server 356. Furthermore, the I/O controller 339 may be coupled to a PCI bus 344 and a network interface card (NIC) 362. Although the description makes reference to specific components of the system 300, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations that falls within the true spirit and scope of this present invention.

What is claimed is:

1. A method comprising:
receiving a plurality of digital images, each image including object pixels for a dynamic target object, non-object pixels for a static object, and non-object pixels for an additional dynamic object;
aligning a first sequence of digital images with a second sequence of digital images that is not adjacent to the first sequence of digital images, the first and second sequences of digital images included in the plurality of digital images;
selecting a first digital image from the first sequence of digital images and selecting a second digital image from the second sequence of digital images;
filtering the non-object pixels for the additional dynamic object of the first digital image from the object pixels for the dynamic target object of the first digital image based on the non-object pixels for the additional dynamic object in the first and second digital images being less similar than the object pixels for the dynamic target object in the first and second digital images;
selecting a third digital image that includes non-object pixels; and
filtering the non-object pixels for the static object of the first digital image from the object pixels for the dynamic target object of the first digital image based on the non-object pixels in the third digital image being more similar to the non-object pixels for the static object in the first and second digital images than to the object pixels for the dynamic target object in the first and second digital images;
wherein the dynamic target object and the additional dynamic object are both non-stationary and change locations in adjacent neighboring frames, the dynamic target object is not found in a sequence of frames that is subsequent to a sequence of frames including the dynamic target object, and the third digital image is included in a frame that is non-adjacent and does not neighbor a frame that includes one of the first and second digital images.

2. The method of claim 1 further comprising determining a similarity (D) for a first object pixel of the first digital image based on $$D = \sum_N |\Delta R| + |\Delta G| + |\Delta B|,$$

the R, G, and B comprising colors of the first object pixel.

3. The method of claim 2 further comprising filtering the first object pixel based on the D of the first object pixel exceeding a first threshold.

4. The method of claim 1 further comprising searching a digital video for digital images that match the filtered object pixels.

* * * * *